US010716018B2

(12) United States Patent
Mufti et al.

(10) Patent No.: US 10,716,018 B2
(45) Date of Patent: *Jul. 14, 2020

(54) SYSTEMS AND METHODS FOR EMERGENCY CALL ROUTE FAILOVER

(71) Applicant: T-Mobile USA, Inc., Bellevue, WA (US)

(72) Inventors: Shujaur Rehman Mufti, Snoqualmie, WA (US); William Michael Hooker, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/749,948

(22) Filed: Jan. 22, 2020

(65) Prior Publication Data

US 2020/0162946 A1 May 21, 2020

Related U.S. Application Data

(62) Division of application No. 16/211,222, filed on Dec. 5, 2018, now Pat. No. 10,602,384, which is a division
(Continued)

(51) Int. Cl.
*H04W 4/00* (2018.01)
*H04W 24/04* (2009.01)
(Continued)

(52) U.S. Cl.
CPC ......... *H04W 24/04* (2013.01); *H04L 65/1016* (2013.01); *H04L 65/1046* (2013.01);
(Continued)

(58) Field of Classification Search
CPC ....... H04W 24/04; H04W 4/90; H04W 76/50; H04W 76/10; H04W 80/04; H04W 88/16;
(Continued)

(56) References Cited

U.S. PATENT DOCUMENTS 9,426,833 B2  8/2016  Mufti et al.
9,967,760 B2  5/2018  Mufti et al.
(Continued)

FOREIGN PATENT DOCUMENTS

EP      2445164 A1   4/2012
JP   2012169872 A   9/2012
(Continued)

OTHER PUBLICATIONS

3rd Generation Partnership Project, Technical Specification Group Core Network and Terminals; Stage 3, Release 9; 3GPP TS 24.229; Feb. 13, 2013, 680 pages.
(Continued)

*Primary Examiner* — Pakee Fang
(74) *Attorney, Agent, or Firm* — Perkins Coie LLP

(57) ABSTRACT

A system and method for performing an emergency call route failover between an Emergency Call Session Control Function (E-CSCF) and multi-homed remote end-point functions such as Border Gateway Control Function (BGCF)/Media Gateway Control Function (MGCF) or Interconnection Border Control Function (IBCF) in an Internet Protocol Multimedia Subsystem (IMS) uses Session Initiation Protocol (SIP) and/or Domain Name System (DNS) methods. The E-CSCF and/or a DNS server monitors the availability of the remote end-points to create a peer list of route options. The E-CSCF or the DNS server selects a route option from the peer list to route an emergency call to an appropriate Public Safety Answering Point (PSAP). In the event that the route option fails, the E-CSCF fails over to the next available route option to route the emergency call.

17 Claims, 8 Drawing Sheets

Related U.S. Application Data of application No. 15/946,698, filed on Apr. 5, 2018, now Pat. No. 10,219,171, which is a division of application No. 15/242,426, filed on Aug. 19, 2016, now Pat. No. 9,967,760, which is a division of application No. 13/783,184, filed on Mar. 1, 2013, now Pat. No. 9,426,833.

(51) Int. Cl.

| | | |
|---|---|---|
| *H04L 29/06* | (2006.01) | |
| *H04W 76/50* | (2018.01) | |
| *H04W 4/90* | (2018.01) | |
| *H04W 76/10* | (2018.01) | |
| *H04W 88/16* | (2009.01) | |
| *H04W 80/04* | (2009.01) | |

(52) U.S. Cl.
CPC ........... *H04L 65/1069* (2013.01); *H04W 4/90* (2018.02); *H04W 76/10* (2018.02); *H04W 76/50* (2018.02); *H04W 80/04* (2013.01); *H04W 88/16* (2013.01)

(58) Field of Classification Search
CPC ............. H04L 65/1016; H04L 65/1046; H04L 65/1069
See application file for complete search history.

(56) References Cited

U.S. PATENT DOCUMENTS

| | | | |
|---|---|---|---|
| 10,219,171 B2 | 2/2019 | Mufti et al. | |
| 2008/0101224 A1 | 5/2008 | Khasnabish | |
| 2008/0207170 A1* | 8/2008 | Khetawat | H04W 60/005 455/411 |
| 2009/0232130 A1 | 9/2009 | Philavong et al. | |
| 2009/0245183 A1 | 10/2009 | Baker et al. | |
| 2009/0248822 A1 | 10/2009 | De Vriendt et al. | |
| 2010/0067519 A1* | 3/2010 | Mang | H04M 3/367 370/352 |
| 2010/0103927 A1 | 4/2010 | Bakker | |
| 2010/0131639 A1 | 5/2010 | Narayana et al. | |
| 2010/0232403 A1 | 9/2010 | Qiu et al. | |
| 2010/0316399 A1 | 12/2010 | Hanamoto et al. | |
| 2011/0103373 A1* | 5/2011 | Shatsky | H04L 65/1016 370/352 |
| 2012/0179829 A1 | 7/2012 | George | |
| 2012/0269188 A1 | 10/2012 | Meranchik | |
| 2013/0029634 A1 | 1/2013 | Li | |
| 2013/0067552 A1* | 3/2013 | Hawkes | H04W 12/06 726/7 |
| 2013/0324154 A1* | 12/2013 | Raghupathy | G01S 19/10 455/456.1 |
| 2016/0360431 A1 | 12/2016 | Mufti et al. | |
| 2018/0227778 A1 | 8/2018 | Mufti et al. | |
| 2019/0110215 A1 | 4/2019 | Mufti et al. | |

FOREIGN PATENT DOCUMENTS

| | | |
|---|---|---|
| WO | 2012072407 A1 | 6/2012 |
| WO | 2014134220 A1 | 9/2014 |

OTHER PUBLICATIONS

3rd Generation Partnership Project, Technical Specification Group Services and System Aspects; Feasibility Study on IMS Evolution; Release 9; 3GPP TS 23.812; May 20, 2009, 26 pages.
Bertrand, Gilles. "The IP Multimedia Subsystem in Next Generation Networks." Network, Security, and Multimedia Lab (RSM department)—GET/ENST, Telecom Bretagne, Rennes, France, May 30, 2007, 9 pages.
European Patent Office, Extended European Search Report, EP Patent Application 147576235, dated Nov. 18, 2016, 10 pages.
International Searching Authority, International Search Report and Written Opinion, PCT Application PCT/US2014/018797, dated Jun. 23, 2014, 12 pages.
State Intellectual Property Office of China, First Office Action, CN Patent Application 201480023917.1, dated Jan. 4, 2018, 24 pages, with English translation.
State Intellectual Property Office of China, Second Office Action, CN Patent Application 201480023917.1, dated Sep. 27, 2018, 14 pages, with English translation.
State Intellectual Property Office of China, Third Office Action, CN Patent Application 201480023917.1, dated Jun. 13, 2019, 14 pages.

\* cited by examiner

SYSTEMS AND METHODS FOR EMERGENCY CALL ROUTE FAILOVER

CROSS-REFERENCES TO RELATED APPLICATIONS

This application is a divisional application of U.S. patent application Ser. No. 16/211,222, filed on Dec. 5, 2018; which is a divisional application of U.S. patent application Ser. No. 15/946,698, filed on Apr. 5, 2018; which is a divisional application of U.S. patent application Ser. No. 15/242,426, filed on Aug. 19, 2016, now U.S. Pat. No. 9,967,760; which is a divisional application of U.S. patent application Ser. No. 13/783,184, filed on Mar. 1, 2013, now U.S. Pat. No. 9,426,833; all of which are hereby incorporated herein in their entireties by reference for all purposes.

BACKGROUND

The Internet Protocol Multimedia Subsystem ("IMS"), developed by the standards organization known as the 3rd Generation Partnership Project ("3GPP"), is an architectural framework for delivering Internet Protocol ("IP") multimedia to mobile users, such as users of various mobile devices. An IMS core network ("IMS core") allows wireless and wireline devices to access multimedia, messaging, and voice applications and services. To ease the integration of an IMS core with Internet resources, 3GPP specifications use Internet Engineering Task Force ("IETF") protocols, such as the Session Initiation Protocol ("SIP") and Diameter, within the IMS core.

The IMS core, as defined in the 3GPP TS 23.167 specification, supports emergency services by routing emergency calls (e.g., "911" calls) to the nearest Public Safety Answering Point (PSAP), which is a physical location that receives emergency calls from the public.

DETAILED DESCRIPTION

The Internet Protocol Multimedia Subsystem ("IMS") core network ("IMS core") supports emergency services (e.g., "911" calls) via an IMS functional element known as an Emergency Call Session Control Function ("E-CSCF"). The E-CSCF routes emergency call requests to the nearest Public Safety Answering Point ("PSAP") via remote endpoint functional elements or gateway nodes such as a Border Gateway Control Function ("BGCF"), a Media Gateway Control Function ("MGCF") or an Interconnection Border Control Function ("IBCF"). Multimedia sessions between these and other IMS functional elements are created and controlled using a client-server signaling protocol known as the Session Initiation Protocol ("SIP").

In implementations described in detail below, systems and methods for emergency call route failover are disclosed. The failover routing mechanisms are used to manage redundancy in signaling gateway nodes such as the BGCF/MGCF and the IBCF by the E-CSCF to select appropriate failover nodes in the event of some form of failure.

When an emergency call request arrives, the E-CSCF identifies an appropriate PSAP, and routes the request to the PSAP via a BGCF (which determines the MGCF), an MGCF or an IBCF (each hereinafter "remote node" or "node"). When a remote node selected by the E-CSCF for routing the emergency call request is down, or otherwise unavailable, there is no redundancy mechanism available or outlined in the existing E-CSCF specifications and standards to complete the connection to the PSAP. The systems and methods disclosed allow the E-CSCF to monitor remote nodes to determine their status (e.g., up or down) and select a routing option towards a remote node that is available, based on different unique criteria, such as a SIP OPTIONS method and a Domain Name Service ("DNS") method, as described in detail below. The implementation of one or more failover routing mechanisms provide redundancy in emergency call routing and provide the advantage of faster and/or efficient routing of emergency calls to appropriate PSAPs.

Various embodiments of the disclosed systems and methods will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
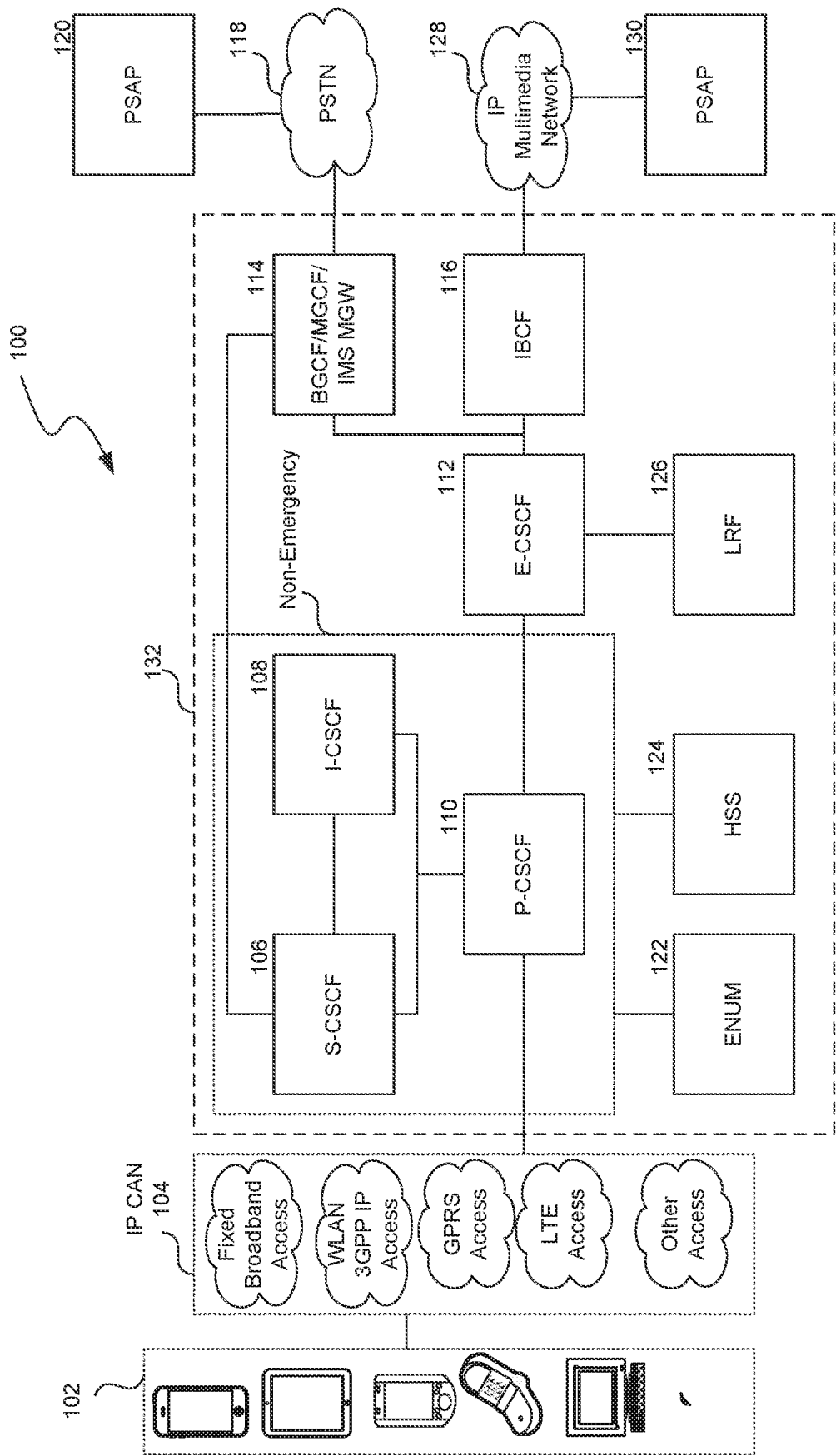
FIG. 1 shows a representative Internet Protocol Multimedia Subsystem ("IMS") environment having redundancy mechanism in place for routing emergency calls to Public Safety Answering Points ("PSAPs").

FIG. 1 is a diagram of a representative IMS environment 100 having a redundancy mechanism in place for routing emergency calls to PSAPs. Environment 100 includes a user equipment ("UE") 102 for initiating an emergency call. The UE 102 connects to an Internet Protocol ("IP") Connectivity Access Network ("IP-CAN") 104. IP-CAN 104 is a collection of network entities and interfaces that provide the underlying IP transport connectivity between the UE 102 and the IMS entities. The IMS core is not dependent on any specific type of access network. Thus the IP-CAN 104 can include, for example, General Packet Radio Service ("GPRS"), Universal Mobile Telecommunications System ("UMTS"), Long Term Evolution ("LTE"), CDMA2000, fixed wireline (e.g., DSL, Ethernet, cable, etc.), WiMax, fixed broadband access, Wireless Local Access Network ("WLAN"), or other wired or wireless communications connection. The UE 102 may include any devices that can connect to the IP-CAN 104. Some of the devices can be IMS-capable (i.e., can handle signaling and/or media transport protocols of the IMS core), while others can be non-IMS-capable. For example, the UE 102 may include, but is not limited to: mobile phones, Voice over Internet Protocol ("VoIP") devices, personal digital assistants, radio frequency devices, infra-red devices, hand-held computers, laptop computers, desktop computers, netbooks, wearable computers, tablet devices, pagers, voice over IP (VoIP) phones, media players, gaming device, set-top boxes, and the like.

A call request from the UE 102, which can be an emergency call request (e.g. "911 call") or a normal call request, is received by a Proxy Call Session Control Function ("P-CSCF") 110. The P-CSCF 110 examines the received call request to determine whether the call request is an emergency call request or a normal or non-emergency call request. If the call request is a normal or non-emergency call request, the P-CSCF 110 communicates with the Serving Call Session Control Function ("S-CSCF") 106 and the Interrogating Call Session Control Function ("I-CSCF") 108 to route the call request to a terminating UE in the Public Switched Telephone Network ("PSTN") 118 or the IP network 128. For example, in one implementation, the call may be routed via a Media Gateway Control Function ("MGCF") 114 selected by a Boarder Gateway Control Function ("BGCF") to the PSTN 118. In another implementation, the call may be routed via an Interconnection Border Control Function ("IBCF") 116 to the IP network 128. In order to perform the routing, the P-CSCF 110 and/or other IMS entities may use information from the tElephone NUmber Mapping server ("ENUM") 122 and/or Home Subscriber Server ("HSS") 124.

When the call request is an emergency call request, the P-CSCF 110 classifies or flags the call request as an emergency call request and selects an E-CSCF 112 in the same network to handle the emergency call request. The E-CSCF 112 communicates with a Location Retrieval Function ("LRF") 126, which retrieves location information for the UE 102, and obtains routing information (e.g., address of the PSAP) for the emergency call from one or more entities supporting location services as the Gateway Mobile Location Center ("GMLC") (not shown).

As described above, the MGCF 114 supports the IMS-PSTN interworking. The IBCF 116 supports interworking with other networks that are more likely to be IP networks 128 than Time Division Multiplexing ("TDM") networks such as PSTN 118. The IBCF 116 sits on a Session Border Controller ("SBC", not shown) at the edge of the IMS core. Depending on the details associated with the emergency call request, the emergency call may be routed to a BGCF/MGCF 114 or to an IBCF 116. If the E-CSCF 112 selects an MGCF 114 as the routing node, the MGCF 114 routes the emergency call to a PSAP 120 sitting in the PSTN network 118. Similarly, if the E-CSCF 112 selects an IBCF 116 as the routing node, the IBCF 116 routes the emergency call to a PSAP 130 in the IP network 128. The S-CSCF 106, the I-CSCF 108, the P-CSCF 110, the E-CSCF 112, the BGCF/MGCF 114, IBCF 116, ENUM 122, HSS 124 and LRF 126 may be considered as IMS entities that are a part of the IMS core 132.

Figure 2A:
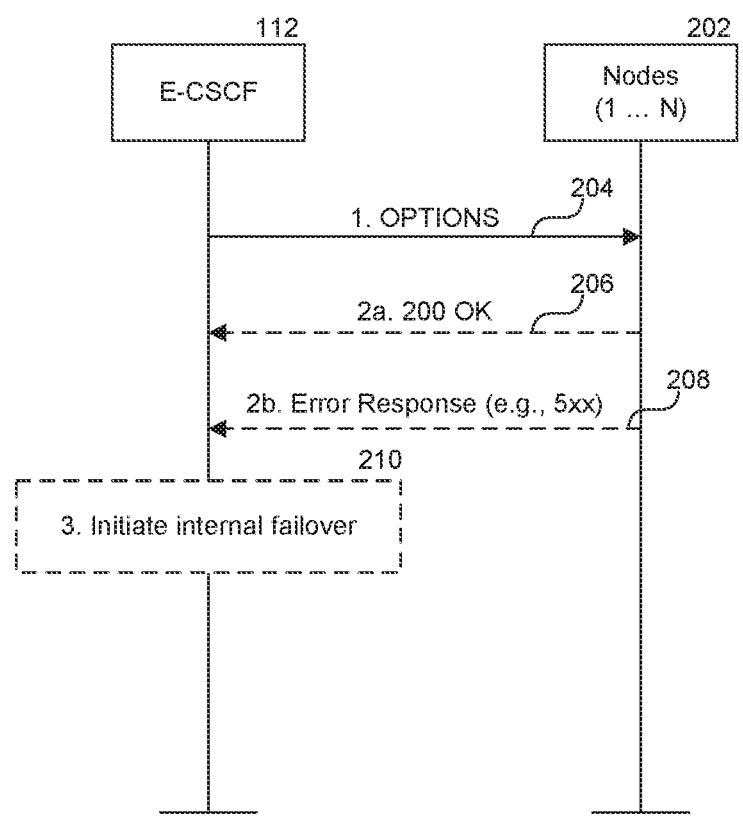
FIG. 2A is a call flow diagram illustrating periodic monitoring of remote nodes in the IMS environment.

FIG. 2A is a flow diagram illustrating periodic monitoring of remote nodes 202 in the IMS environment by the E-CSCF 112. The E-CSCF 112 uses a SIP-based method to monitor the availability of each of the nodes 202, which may include the BGCF/MGCF nodes 114 and/or the IBCF nodes 116. In one implementation, the E-CSCF 112 initiates or sends a SIP "OPTIONS" message 204 towards each of the nodes 202 at a configurable frequency (e.g., every 5 seconds). At any given time, some of the nodes 202 may be available, while others may be unavailable or down. If a node is up and running, the node responds with a "200 OK" message 206.

Alternately, if a node is unavailable, an error code 208 may be returned. In one implementation, the error code 208 may be a "503" (Service Unavailable) error response. In other implementations, other server failure 5xx error codes may be returned by the nodes to indicate an error condition, such as a particular error condition. 5xx error codes may include, for example, "500" (Server Internal Failure), "502" (Bad Gateway), "504" (i.e., Server Timeout), "505" (Version Not Supported) and "513" (Message too Large). The errors are described in detail in RFC 3261 "SIP: Session Initiation Protocol" which is incorporated by reference herein.

At block 210, when any server failure error code 5xx is received as a response to the OPTIONS message from a node, or no response is received, the E-CSCF 112 initiates an internal failover to take the node out of route choices for routing emergency call traffic. In one implementation, the E-CSCF 112 may maintain a first peer list for BGCF/MGCF nodes and a second peer list for IBCF nodes. Of course, other peer lists are possible, such as an all-inclusive list of BGCF/MGCF or IBCF nodes. The nodes may be identified based on an identifier or IP address. Based on the responses, the E-CSCF 112 may mark or flag the nodes responding with a 5xx error code as being unavailable in the corresponding peer list (or if no response is received). Alternately, the unavailable nodes may be removed from the corresponding peer list. In either implementation, the unavailable nodes are detected, and are not used as a peer for routing emergency call traffic, at least for a time duration. In this way, the E-CSCF maintains an active, current list of remote nodes to use when it receives an emergency call.

In one implementation, the E-CSCF 112 may not send any heartbeat signal (e.g., OPTIONS message, polling signal, etc.) towards a node if the link between the E-CSCF 112 and the node is active. When the link between the two is idle, the E-CSCF 112 may start sending heartbeats at a configurable frequency (e.g., few milliseconds to a few seconds). The sending of the heartbeat signals may be automated using retransmit timers that back off exponentially. When a previously unavailable node becomes available, the node may be added to the corresponding peer list by the E-CSCF 112.

Figure 2B:
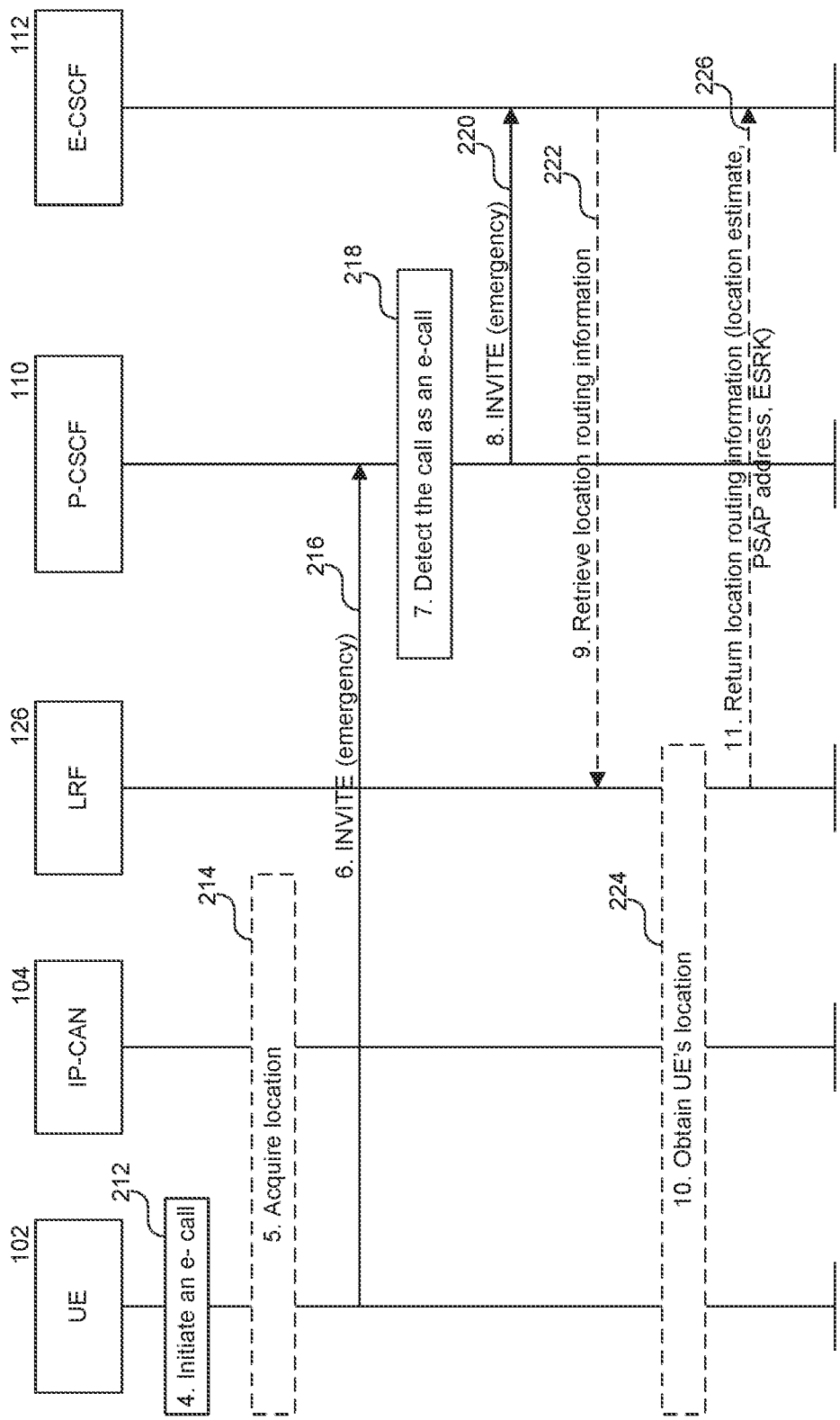
FIG. 2B is a call flow diagram illustrating emergency call set up in the IMS environment.

FIG. 2B is a flow diagram illustrating an emergency call set up in the IMS environment. For clarity, the UE 102 is illustrated as an IMS-capable device (e.g., a SIP phone) using SIP signaling for communication with various IMS core entities such as the LRF 126, P-CSCF 110 and the E-CSCF 112. However, it should be noted that UE 102 may be any other device that is not IMS-capable (e.g., a GSM phone) that can connect to one of many IP-CAN 104 supported by the IMS core.

At block 212, the UE 102 initiates an emergency call request. The emergency call request is for establishing an emergency call with an appropriate PSAP, and for delivery of location information associated with the subscriber's UE 102 to the PSAP. The location information may be acquired via one or more procedures. For example, in one implementation, the UE 102 may determine its own location or location identifier with or without the assistance of the IP-CAN 104 at block 214. Various location determining methods are of course possible.

The UE 102 next sends a SIP INVITE request message 216 with an emergency indication to the P-CSCF 110. For non-IMS-capable UEs, the gateways (e.g., a media gateway) can send a SIP INVITE message with an emergency indication to the P-CSCF 110 on behalf of the UE. In some implementations, the INVITE message 216 may include location information, such as the location information acquired at block 214.

The P-CSCF 110 detects the INVITE request message 216 as an emergency call request at block 218. The P-CSCF 110 then selects an E-CSCF 112 in the same network to handle the emergency call request. The P-CSCF 110 forwards the INVITE request message 220 to the E-CSCF 112. In one implementation, the INVITE request message 220 may include insufficient or no location information for the E-CSCF 112 to determine the geographical location of the UE 102 and/or the address of the PSAP where the emergency call should be routed to. The E-CSCF 112 may thus send a request 222 to the LRF 126 to retrieve location and/or routing information based on which E-CSCF 112 can redirect the emergency call to the next hop (i.e., BGCF/MGCF or IBCF). The location request 222 may include information identifying the IP-CAN 104, the UE 102, means to access the UE (e.g. UE's IP address or other electronic address/identifier), or the like.

The LRF 126 may obtain and/or verify the location of the UE 102 at block 224. The LRF 126 may use procedures defined in 3GPP TS 23.271 for control plane location or procedures defined by the Open Mobile Alliance ("OMA") for Secure User Plane Location ("SUPL") to determine the location of the UE 102. The LRF 126 may also determine an address for a PSAP selected for the emergency call via the GMLC or by invoking a Routing Determination Function ("RDF") to convert the location of the UE 102 into a PSAP address. In one implementation, the LRF 126 stores some or all the information obtained, received and/or associated with the UE 102 and the emergency call request in a record. The LRF 126 may send the location information (UE location) and/or the routing information (PSAP address) 226 to the E-CSCF 112. In addition to the location and/or routing information, the LRF 126 may also send correlation information to the E-CSCF 112. The correlation information identifies the record for the emergency call stored in the LRF 126, and can be used by the PSAP as a key to later request the UE's location information from the LRF 126. The correlation information may include an Emergency Services Routing Key ("ESRK") or the Emergency Services Query Key ("ESQK"). An ESRK is a 10-digit (or may be more or less digits) routable, but not necessarily dialable, number that may be used to identify the UE 102 and the LRF 126 for the emergency call. For example, each LRF may allocate ESRK numbers from a different unique range of numbers, which allows the PSAP to determine the LRF based on the number range for a particular ESRK. The details of the acquiring of location information and/or routing information are described in detail in the 3GPP TS 123.167 technical specification, which is incorporated by reference herein.

Figure 2C:
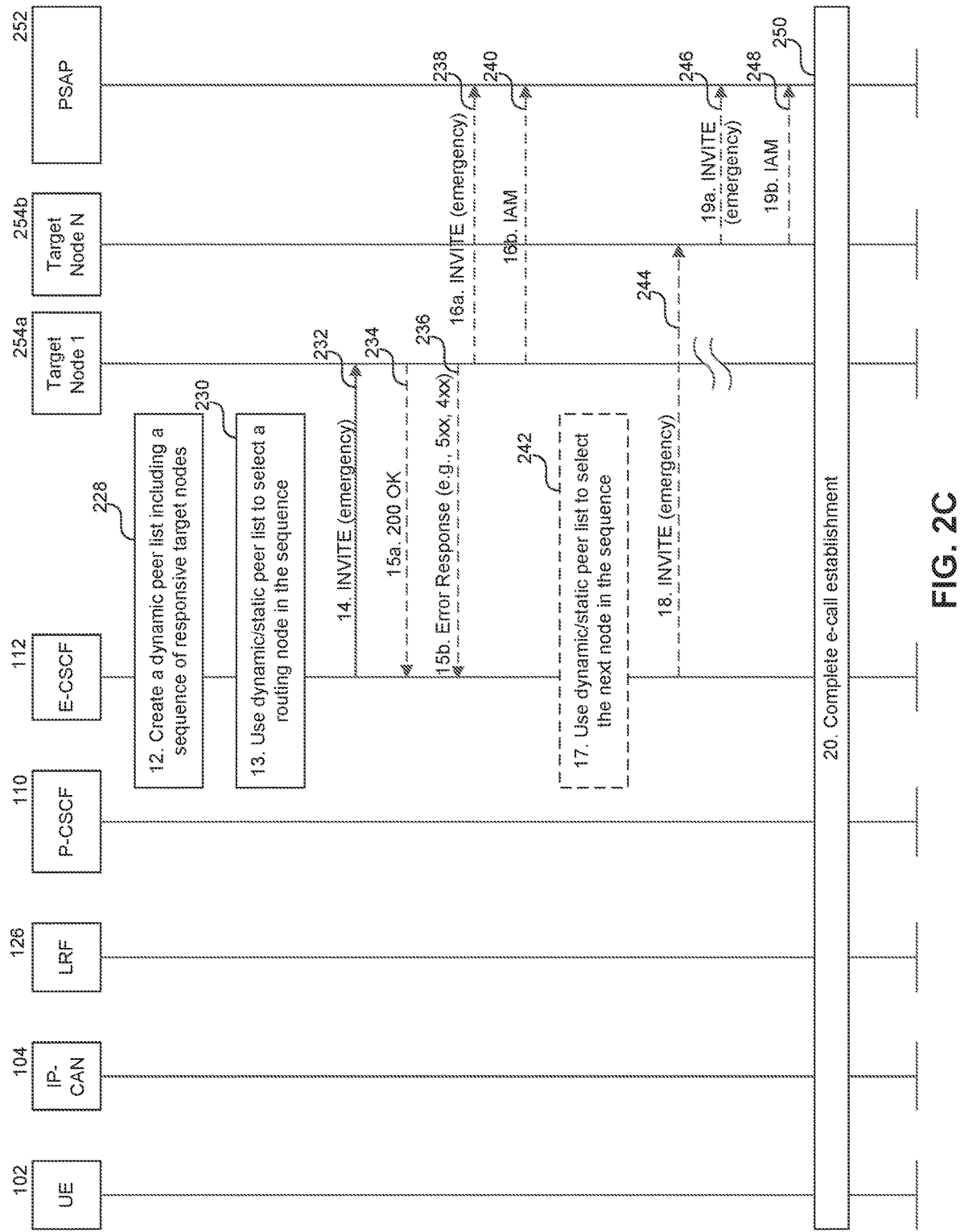
FIG. 2C is a call flow diagram illustrating an emergency call route failover based on Session Initiation Proxy ("SIP") OPTIONS method in the IMS environment.

FIG. 2C is a flow diagram illustrating an emergency call route failover based on a SIP OPTIONS method in the IMS environment. When the E-CSCF 112 has the location and/or routing information, the E-CSCF 112 may route the emergency call to a PSAP 252. The PSAP 252 may be a PSAP 120 sitting behind a PSTN network 118 or an IP-capable PSAP 130 sitting behind an IP network 128. At block 228, the E-CSCF 112, depending on the details of the INVITE request and/or the PSAP address, dynamically creates a peer list ("dynamic peer list" or "hunt list") of available BGCF/MGCF nodes or available IBCF nodes arranged in a specific order. The dynamic peer list may also be generated before receiving an emergency call (e.g. before for each emergency call request received by the E-CSCF 112).

At block 230, the E-CSCF 112 selects a target node from the dynamic peer list, and modifies or adjusts the INVITE request message received from the P-CSCF 110 for delivery to the selected node 254a. For example, if the selected node 254a is an MGCF, the INVITE request message may include the address of the PSAP 252 as destination, the host/domain name or IP address of the MGCF as the next hop, UE location information, the ESRK, and the like. Similarly, if the selected node is an IBCF, the INVITE message may include the PSAP address as the Request Uniform Resource Identifier ("R-URI"), the host/domain name or the IP address of the IBCF as the next hop, UE location information, the ESRK, and the like. The E-CSCF 112 sends the modified or adjusted INVITE request message 232 to the selected node 254a. If the INVITE request message 232 is successfully received by the selected node 254a, a "200 OK" message 234 is sent by the selected node 254a to the E-CSCF 112 to acknowledge the receipt.

The selected node 254a, depending on the TDM or IP connectivity of the PSAP 252, may send a SIP INVITE message 238 or an Initial Address Message ("IAM") 240 to the PSAP 252. For example, an MGCF may convert the SIP INVITE request message 232 to an Integrated Services Digital Network User Part ("ISUP") IAM 240, which is a part of the Signaling System No. 7 ("SS7") used for setting up telephone calls in the PSTN. An IBCF, on the other hand, may adjust and forward the SIP INVITE request message 238 to an IP capable PSAP.

Alternately, in one implementation, the selected node 254a may not be able to process the INVITE request message 232 due to various reasons such as temporary overloading or maintenance, etc. The selected node 254a may respond with a 5xx error code (e.g., "503" or Service Unavailable error). Alternately, the selected node 254a may provide no response at all, in which case, the E-CSCF 112 may self-generate an error code such as "408" (Request Time out) error. In case of the "503", "408" or other error codes that indicate failed response to the INVITE request message, the E-CSCF 112 selects the next node in the sequence of available nodes in the dynamic peer list as an option for routing the emergency call request. The E-CSCF 112 sends a SIP INVITE request message 244 to the selected node 254b. The E-CSCF 112 may continue to hunt for an available or responsive node by moving down the nodes in the dynamic peer list until one of the nodes responds with a "200 OK" message. As before, the selected node 254b forwards the SIP INVITE request message 245 to a SIP/IP capable PSAP or sends an ISUP IAM 248 to a PSAP with TDM connectivity. Following delivery of the SIP INVITE request message or ISUP IAM message to the PSAP 252, the emergency call establishment is completed at block 250.

Figure 2D:
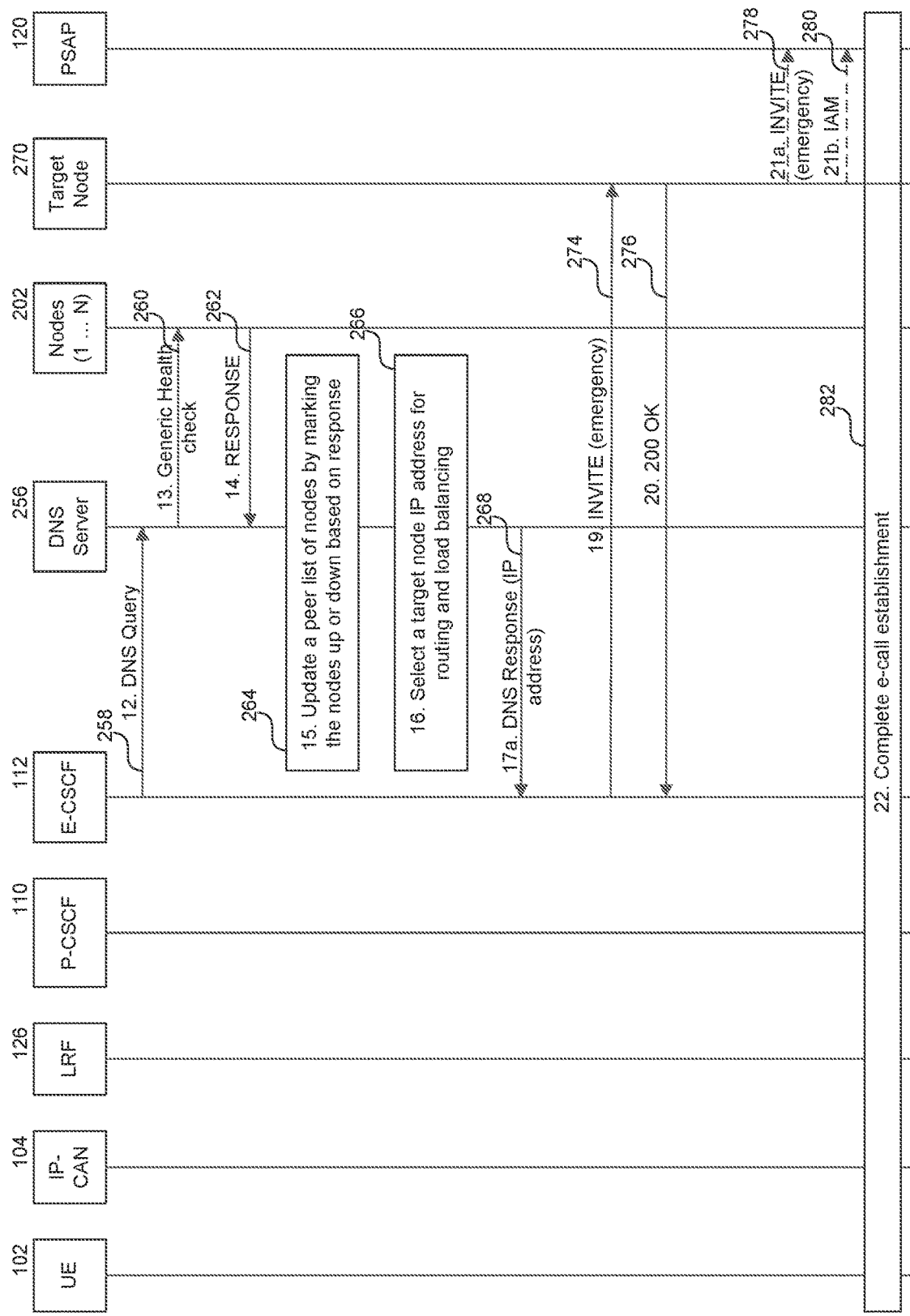
FIG. 2D is a call flow diagram illustrating an emergency call route failover based on Domain Name System ("DNS") supervision in the IMS environment.

FIG. 2D is a flow diagram illustrating an emergency call route failover based on Domain Name System ("DNS") supervision in the IMS environment. In one embodiment, the IMS core 132 may implement a DNS server 256 to monitor the health of the nodes 202. Alternatively or additionally, the DNS server 256 may implement a load balancing strategy to distribute the routing of emergency calls to different nodes. The DNS server 256 resolves a Fully Qualified Domain Name ("FQDN") to different IP addresses corresponding to different nodes based on round-robin or other strategy to load balance.

In one implementation, the E-CSCF 112 sends a DNS query 258 to the DNS server 256 to resolve the FQDN of an MGCF node (e.g., mgcf1@t-mobile.com) or an IBCF node (e.g., ibcf1@t-mobile.com), for example. The DNS server 256 monitors the health of the nodes 202 by performing periodic checks using one or more diagnostic methods such as ping polling, Simple Network Management Protocol ("SNMP") polling, and the like. In one implementation, the nodes 202 may include an interface such as the SNMP interface to provide node-specific information to the DNS server 256. For example, the DNS server 256 periodically sends a generic health check 260 towards the nodes 202. SNMP agents running on the nodes 202 respond with a response 262. In one implementation, the response 262 may be variables, data or other node-specific information collected by the SNMP agents and acknowledgement to the health check requests. Alternatively, the response 262 may be an error response.

In one embodiment, the DNS server 256 is responsible for dynamically creating a peer list of nodes that are diagnosed as being healthy, and selecting a node from the dynamic peer list to which an emergency call request is routed. In one implementation, static peer lists for BGCF/MGCF and IBCF nodes may be maintained by the DNS server 256. At block 264, the DNS server 256 updates a peer list of BGCF/MGCF nodes and/or a peer list of IBCF nodes by marking those nodes that respond with an error as being down or unavailable, fail to respond, or are otherwise unusable by the system. Alternately, the nodes that respond with acknowledgement and/or other data may be marked as being up or available. At block 266, the DNS server 256 uses the updated peer list to select an available target node IP address from the peer list. In one implementation, the DNS server 256 may use a round-robin scheduling, geographical scheduling, selection based on area code/Automatic Number Identification ("ANI"), or any other methods to select an available target node IP address to implement load sharing among the available nodes.

The DNS server 256 provides a response 268 that includes an IP address of the selected node to the DNS query from the E-CSCF 112. The E-CSCF 112 then sends an INVITE request message 274 towards the selected node 270. The selected node 270 acknowledges receiving the INVITE request message 274 by returning a "200 OK" message 276 to the E-CSCF 112. Depending on the node type, the selected node then forwards the SIP INVITE request message 278 to a PSAP with IP connectivity or an ISUP IAM 280 towards a PSAP with TDM connectivity. At block 282, the emergency call establishment is completed.

In one implementation, the DNS query 258 to the DNS server 256 may time out. When the DNS server 256 times out, without providing an IP address of the next hop for routing the emergency call request, the E-CSCF 112 may use a backup peer list to select a node and route the emergency call request via the selected node. If the selected node is down, the E-CSCF 112 may hunt down the peer list to select a different node for routing the emergency call until the SIP INVITE request message to a node is successfully acknowledged by the node. In one implementation, the E-CSCF 112 may take on the role of selecting a node for routing emergency calls until the DNS server comes back up.

Figure 3:
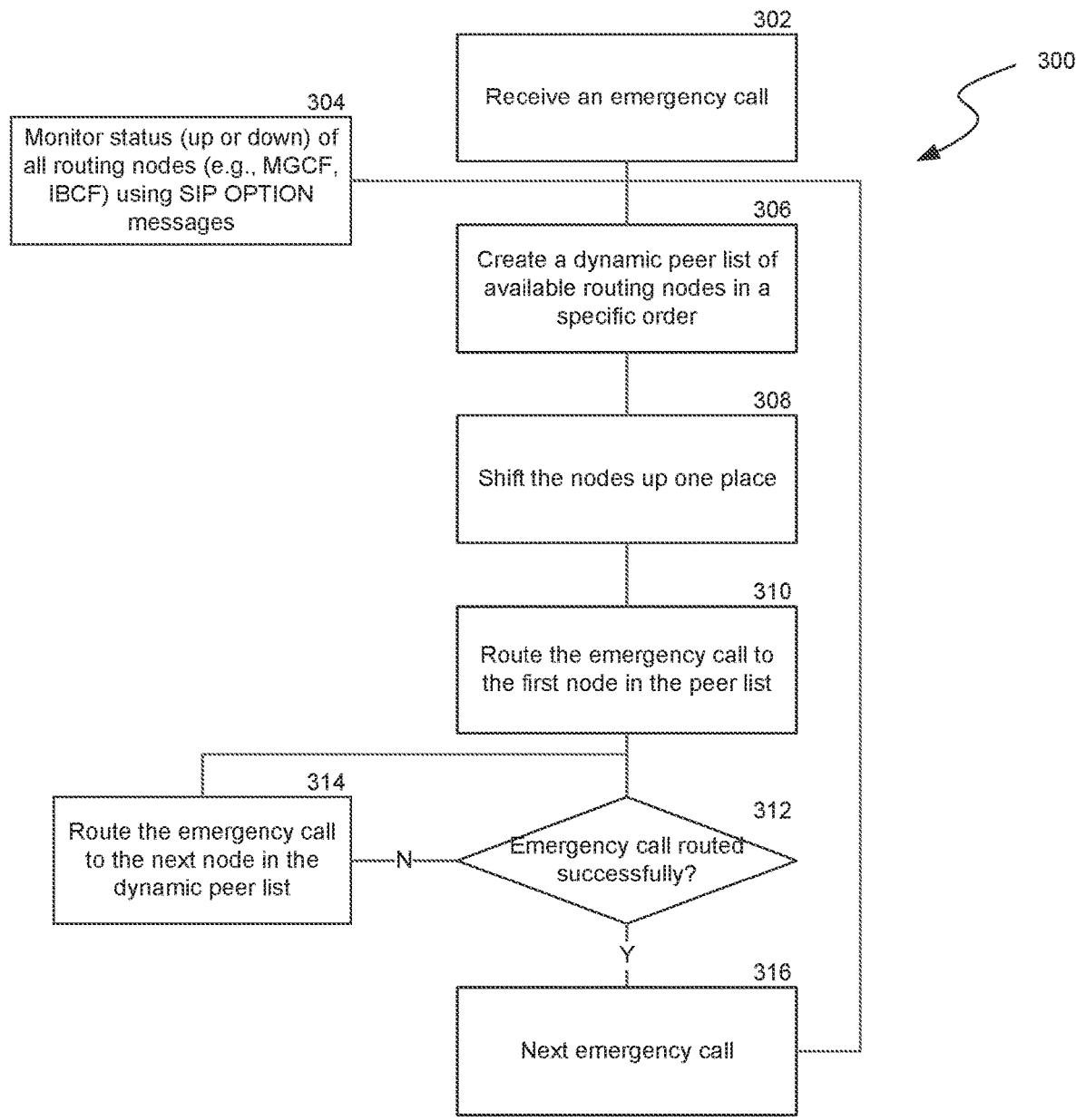
FIG. 3 is a logic flow diagram illustrating an emergency call route failover based on a dynamically created peer list in the IMS environment.

FIG. 3 is a logic flow diagram illustrating a method 300 for an emergency call route failover based on a dynamically created peer list in the IMS environment. In one implementation, at block 304, an E-CSCF 112 monitors the status of all remote nodes (i.e., BGCFs/MGCFs and/or the IBCFs) using, e.g., the SIP OPTIONS method as described in detail with respect to FIG. 2A. At block 302, the E-CSCF 112 receives a SIP INVITE request message for an emergency call. At block 306, the E-CSCF 112 dynamically creates a peer list for the emergency call request based on status information on the nodes, or uses a previously created peer list. The dynamic peer list may list only the available nodes in a specific order. Alternately, the dynamic peer list may list all the nodes in a specific order, but mark each node as being up (available) or down (unavailable). In another implementation, instead of dynamically creating a new peer list when an INVITE request arrives, a persistent or static peer list may be created and maintained by the E-CSCF 112. The static peer list may be periodically or continually updated as the E-CSCF 112 detects any change on the up or down status of the nodes.

At block 308, in one implementation, the E-CSCF 112 shifts the nodes up one place in the peer list for load balancing. By shifting the nodes up one place, the E-CSCF 112 avoids selecting the previously selected node for routing the emergency call. In an alternate implementation, the dynamic and/or static peer list may include a pointer, a bit increment or other indicator means for identifying the next node in the queue for selection. The shifting or tracking ensures that nodes selected for routing are constantly cycled and routing load is distributed among the available nodes. In one implementation, block 308 may be performed when the peer list is dynamically generated. The block 308 may be optional in some implementations. Other load balancing methods are of course possible.

At block 310, the E-CSCF 112 selects a node from the dynamic peer list to route the emergency call. The E-CSCF 112 may include additional information such as location of the caller, R-URI or other identifier of the PSAP, and the like before forwarding the INVITE request message to the IP address of the selected node. In response to the INVITE request message, the E-CSCF 112 may receive a response or no response at all. In one implementation, at decision block 312, if the emergency call is routed successfully to the selected node, as evidenced by receipt of an acknowledgement message (e.g., "200 OK") from the selected node, the E-CSCF 112 concludes the emergency call routing process and moves on to handle another emergency call at block 316. Alternately, if the emergency call routing is not successful, as evidenced by lack of a response from the selected node (e.g., 408 error code for Request Timeout) or an error response (e.g., 503 error code for Service Unavailable), the E-CSCF 112 selects the next available node from the dynamic (or static) peer list and routes the emergency call to the selected node at block 314. The process of selecting the next available node from the dynamic or static peer list and attempting to route the emergency call may continue until a node responds with a success message. When another emergency call is received at block 316, the process moves to block 306, where a new peer list is dynamically created for the emergency call or a static peer list is accessed to select an available node for routing.

Figure 4:
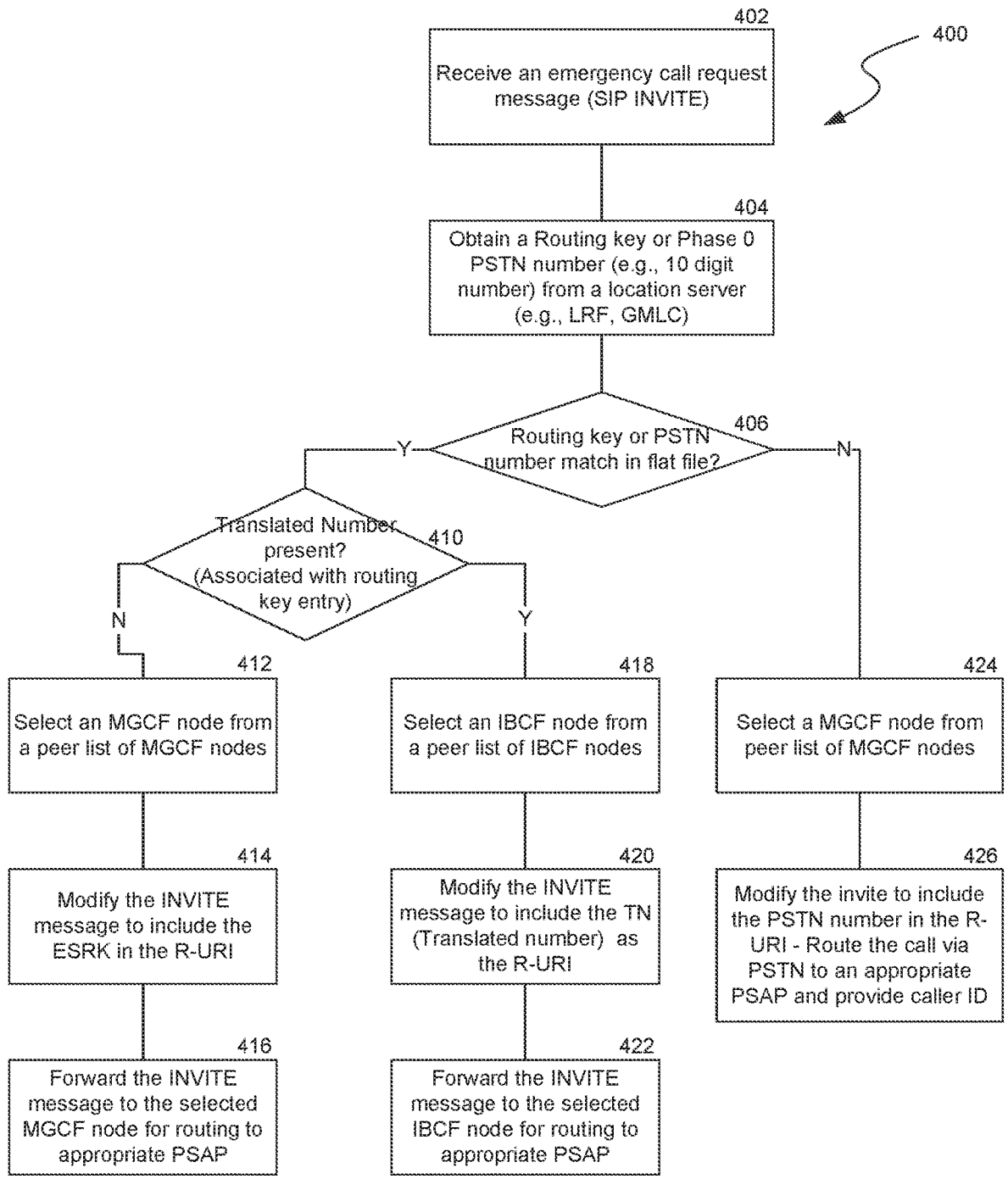
FIG. 4 is a logic flow diagram illustrating peer list selection in the IMS environment based on PSAP capability.

As described above, two peer lists may be created and/or maintained by or at the E-CSCF 112. One of the peer lists includes a list of BGCF/MGCF nodes that are available and the other includes a list of IBCF nodes that are available for emergency call routing. A BGCF/MGCF node helps route the emergency call to a PSAP in the PSTN by translating the SIP signaling to ISUP IAM. Similarly, an IBCF node accepts SIP signaling and helps route the emergency call to a PSAP in an IP network. In one embodiment, to implement an emergency call route failover in both situations, the E-CSCF 112 may implement a method 400 illustrated in FIG. 4 to select a peer list based on the border node (e.g., IBCF on SBC) in the IMS environment.

In one implementation, at block 402, the E-CSCF 112 receives an emergency call request (i.e., a SIP INVITE) from the P-CSCF 110. At block 404, the E-CSCF 112 obtains a routing key or phase0 PSTN number (e.g., ESRK or an E-164 number) associated with the emergency call. As previously described, each LRF 126 (or another location server) may allocate ESRK numbers from a different unique range of numbers to an emergency call. For example, a range of ESRK numbers may be associated with a New York Police Department ("NYPD") PSAP. Emergency calls going to the NYPD PSAP are assigned an ESRK number from the range in sequence to allow each emergency call to be uniquely identified. The PSAP uses the ESRK number in the emergency call request to obtain location and other information (e.g., Global Positioning System coordinates) from the E-CSCF 112 or the LRF, for example. At decision block 406, the E-CSCF 112 determines if the routing key or PSTN number from the LRF matches the ranges in a flat file (or any other type of file or record) that the E-CSCF 112 has access to. If there is no match, the emergency call is identified as a phase 0 call. A phase 0 call is routed to an appropriate PSAP without location information. A phase 0 PSAP may handle only phase 0 emergency calls and may not have the facilities to request additional information about the emergency call from the LRF. For example, a state highway patrol PSAP or a small town PSAP may only accept phase 0 emergency calls. At block 424, the phase 0 call is classified as an emergency call and routed to the appropriate PSAP with caller ID information at block 426.

Alternately, at decision block 406, the E-CSCF 112 may determine that the routing key from the LRF matches the ranges in the flat file. If so, at decision block 410, the E-CSCF 112 determines whether a translated number is present or not associated with the routing key entry. At block 418, if a translated number is present, an IBCF ID or an SBC ID is selected from the peer nodes list. An IBCF ID may be an identifier, an FQDN, an IP address, or the like that indicates that the emergency call is to be routed via an IBCF to a PSAP in another IP network. In one implementation, the IBCF ID may be included in the routing header of the SIP INVITE request message as a hop in the path of the emergency call. If the IBCF ID is present, the E-CSCF 112 selects an IBCF node from a static peer list of IBCF nodes. In one implementation, a dynamic peer list including IBCF nodes that are available may be created or generated. At block 420, the E-CSCF modifies the emergency call request message (e.g., INVITE) to include the translated number in the emergency call request message. For example, the emergency call request message may be adjusted to include the assigned ESRK as the R-URI, the IP address of the selected IBCF node in the routing header, or the like. At block 422, the E-CSCF 112 forwards the emergency call request message to the selected IBCF node for routing towards a PSAP associated with the ESRK.

In another implementation, if routing key is not associated with any translated number, the E-CSCF 112 selects a BGCF/MGCF node from a static peer list of BGCF/MGCF nodes at block 412. In one implementation, a dynamic peer list including available BGCF/MGCF nodes may be created. At block 414, the E-CSCF 112 modifies the emergency call request message to include the ESRK, the IP address of the selected BGCF/MGCF node, or the like. The E-CSCF 112 forwards the emergency call request message to the selected MGCF node for routing to an appropriate PSAP associated with the ESRK at block 416.

Similar methodology may be implemented by a DNS server when the DNS server is responsible for monitoring availability of remote nodes, and selecting a route option from the available remote nodes.

Figure 5:
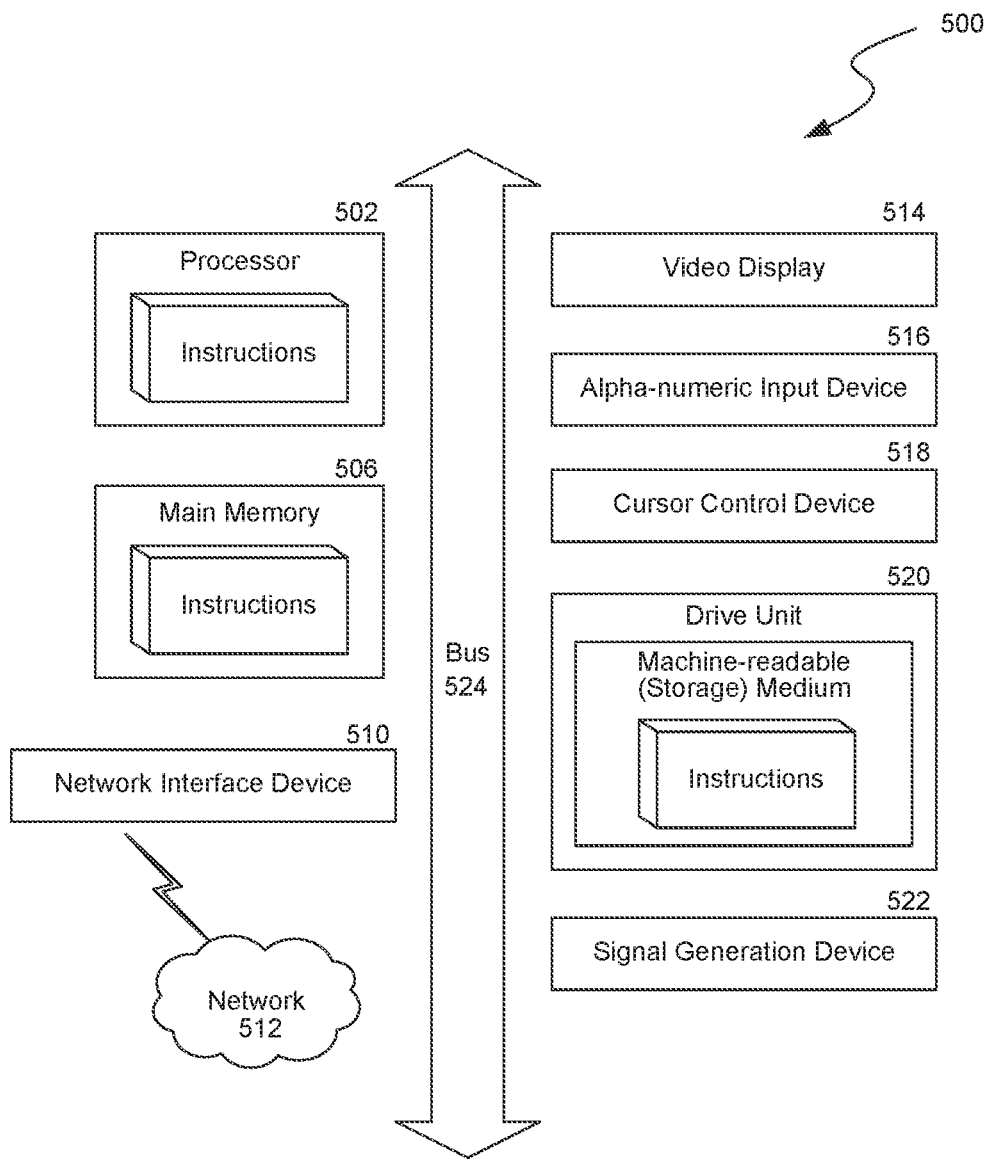
FIG. 5 is a diagrammatic representation of a machine in the example form of a computer system within which a set of instructions, for causing the machine to perform any one or more of the methodologies discussed herein may be executed.

FIG. 5 is a diagrammatic representation of a machine in the example form of a computer system or machine 500 within which a set of instructions, when executed, may cause the machine to perform any one or more of the methods (e.g., methods 300 and 400) described above.

In some embodiments, the machine 500 operates as a standalone device, while in other embodiments, the machine 500 may be connected (e.g., networked) to other machines. In a networked deployment, the machine may operate in the capacity of a server or a client user machine (e.g., UE 102) in a client-server network environment, or as a peer machine in a peer-to-peer (or distributed) network environment.

The machine may comprise a server computer, a client computer, a personal computer (PC), a tablet PC, a laptop computer, a set-top box ("STB"), a personal digital assistant ("PDA"), a cellular telephone, a smart phone, a telephone, a web appliance, a network router, switch or bridge, a console, a hand-held console, a (hand-held) gaming device, or any machine capable of executing a set of instructions (sequential or otherwise) that specify actions to be taken by that machine. In general the machine 500 includes any electronic devices that provide voice, video and data communication. In one embodiment, the machine 500 may include the SIP servers or proxies (e.g., S-CSCF 106, I-CSCF 108, P-CSCF 110, E-CSCF 112, BGCF/MGCF 114, IBCF 116, and the like). While a single machine is illustrated, the machine 500 may include any collection of machines that individually or jointly execute instructions to perform any of the methods described above.

The machine 500 may include a processor 502, a main memory 506 and a bus 524. The bus 524 is a subsystem for transferring data between the components of the machine 500, including transferring data between the main memory 506 and the processor 502. The bus 524 may represent one or more separate physical buses, point to point connections, or both, connected by appropriate bridges, adapters, or controllers. The machine 500 may also include a display device 514 (e.g., Liquid Crystal Display ("LCD"), Cathode Ray Tube ("CRT"). etc.), one or more input devices 516 (e.g., a keyboard, a touch screen, etc.), a cursor control device 518 (e.g., a mouse), a drive unit 520, a signal generation device or output device 522 (e.g., a speaker, a remote control, etc.) and a network interface device 510, among others.

The processor(s) 502 (e.g., a Central Processing Unit ("CPU"), a Graphics Processing Unit ("GPU"), or both) controls the overall operation of the machine 500. The processor(s) 502 executes computer programs or firmware stored in memory (e.g., 506, 520). The processor(s) 502 may include, one or more programmable general-purpose or special-purpose microprocessors, digital signal processors ("DSPs"), programmable controllers, application specific integrated circuits ("ASICs"), programmable logic devices ("PLDs"), trusted platform modules ("TPMs"), or the like, or a combination thereof.

The main memory 506 represents any form of random access memory ("RAM"), read-only memory ("ROM"), flash memory, or the like, or a combination of such devices connected to the bus 524. The drive unit 520 may include a machine-readable medium or machine-readable storage medium that stores, encodes or carries one or more sets of instructions for execution by the machine 500 to perform any or all of the methods described above. It should be noted that the term "machine-readable medium" and "machine-readable storage medium" may include a single medium or multiple media (e.g., a centralized or distributed database, and/or associated caches and servers) that store the one or more sets of instructions embodying any or all of the methods described above. Examples of machine-readable media or machine-readable storage media include, but are not limited to: recordable type media such as volatile (e.g., RAM, non-volatile memory devices (e.g., ROM), the main memory 506, solid state memories, floppy and other removable disks, hard disks, optical disks (e.g., Compact Disk Read-Only Memory ("CD ROMS"), Digital Versatile Disks, ("DVDs"), etc.), or the like.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

The network interface device 510 allows the machine 500 to mediate data in various networks with one or more entities that are external to the machine, through any known and/or convenient communications standards and protocols supported by the machine 500 and the external entities. Example protocols supported by the machine 500 includes, but is not limited to: IP protocols for the application layer (e.g., SIP, Session Description Protocol ("SDP"), Real Time Transport Protocol ("RTP"), Hypertext Transfer Protocol ("HTTP"), SNMP, etc.), transport layer protocols (e.g., Transmission Control Protocol ("TCP"), User Datagram Protocol ("UDP"), etc.), Internet layer protocols (e.g., IPv4, IPv6, etc.), link layer protocols (e.g., Digital Subscriber Line ("DSL"), Ethernet, etc.), or the like. The network interface device 510 can include one or more of a network adaptor card, a wireless network interface card, a router, an access point, a wireless router, a switch, a multilayer switch, a protocol converter, a gateway, a bridge, bridge router, a hub, a digital media receiver, a repeater, or other interfaces for supporting the various protocols. Although the present disclosure describes the components and functions implemented in the embodiments with reference to particular standards and protocols that represent examples of the state of the art, the disclosure is not limited to such standards and protocols, and includes functional equivalents that may supersede the current state of the art.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

We claim:

1. At least one machine-readable medium, excluding transitory signals, having stored thereon instructions, which when executed by at least one machine, implements redundancy in routing emergency calls via gateway nodes in an Internet Protocol Multimedia Subsystem (IMS) network by causing the at least one machine to:
  receive a Session Initiation Protocol (SIP) INVITE request associated with an emergency call;
  create a dynamic peer list including gateway nodes that successfully respond to a SIP OPTIONS request;
  select a gateway node from the dynamic peer list;
  initiate a SIP INVITE request associated with the emergency call towards the selected gateway node to deliver the emergency call to a public safety answering point (PSAP);
  detect a failover condition when the selected gateway node fails to respond to the SIP INVITE request within a time period; and
  in response to the failover condition, continue to select a new gateway node from the dynamic peer list and initiate a SIP INVITE request associated with the emergency call towards the new gateway node until a successful response to the SIP INVITE request is received by the E-CSCF.

2. The at least one machine-readable medium of claim 1, wherein the instructions, when executed, further determine, based on presence or absence of information relating to Interconnection Border Control Function (IBCF) or Session Border Controller (SBC), whether to dynamically create the dynamic peer list including IBCF servers as gateway nodes or Border Gateway Control Function (BGCF) servers or Media Gateway Control Function (MGCF) servers as gateway nodes.

3. The at least one machine-readable medium of claim 1, wherein the instructions, when executed, further:
  obtain, from a location server, routing information for the PSAP, wherein the routing information for the PSAP includes routing information for a Public Switched Telephone Network (PSTN) PSAP or an Internet Protocol (IP) PSAP, and
wherein the routing information for the PSTN PSAP or the IP PSAP includes an Emergency Service Routing Key (ESRK) that is used by the PSTN PSAP or the IP PSAP to request location information associated with the emergency call.

4. The at least one machine-readable medium of claim 1, wherein the dynamic peer list is updated based on responses from the gateway nodes.

5. The at least one machine-readable medium of claim 1, wherein the instructions, when executed, further:
determine a failed status when a gateway node from the multiple gateway nodes fails to provide a response to the SIP OPTION message within a set time period; and
generate a request timeout error when no response is received from the selected gateway node.

6. The at least one machine-readable medium of claim 1, wherein the gateway node is selected from the dynamic peer list based on:
round-robin scheduling,
geographical scheduling,
area code/Automatic Number Identification ("ANI"), or
any combination thereof.

7. A computer-implemented method for implementing redundancy in routing emergency calls via nodes in an Internet Protocol Multimedia Subsystem (IMS) network, the method comprising:
receiving a Session Initiation Protocol (SIP) INVITE request associated with an emergency call;
creating a dynamic peer list including nodes that successfully respond to a SIP OPTIONS request;
selecting a node from the dynamic peer list;
initiating a SIP INVITE request associated with the emergency call towards the selected node to deliver the emergency call to a public safety answering point (PSAP),
detecting a failover condition when the selected node fails to respond to the SIP INVITE request within a time period; and
in response to the failover condition, continuing to select a new node from the dynamic peer list and initiate a SIP INVITE request associated with the emergency call towards the new node until a successful response to the SIP INVITE request is received by the E-CSCF.

8. The computer-implemented method of claim 7 further comprising:
determining, based on presence or absence of information relating to Interconnection Border Control Function (IBCF) or Session Border Controller (SBC), whether to dynamically create the dynamic peer list including IBCF servers as gateway nodes or Border Gateway Control Function (BGCF) servers or Media Gateway Control Function (MGCF) servers as gateway nodes.

9. The computer-implemented method of claim 7 further comprising:
obtaining, from a location server, routing information for the PSAP, wherein the routing information for the PSAP includes routing information for a Public Switched Telephone Network (PSTN) PSAP or an Internet Protocol (IP) PSAP, and
wherein the routing information for the PSTN PSAP or the IP PSAP includes an Emergency Service Routing Key (ESRK) that is used by the PSTN PSAP or the IP PSAP to request location information associated with the emergency call.

10. The computer-implemented method of claim 7, wherein the dynamic peer list is updated based on responses from the nodes.

11. The computer-implemented method of claim 7 further comprising:
determining a failed status when a node from the dynamic peer list fails to provide a response to the SIP OPTION message within a set time period; and
generating a request timeout error when no response is received from the selected node.

12. The computer-implemented method of claim 7, wherein the node is selected from the dynamic peer list based on:
round-robin scheduling,
geographical scheduling,
area code/Automatic Number Identification ("ANI"), or
any combination thereof.

13. A system for implementing redundancy in routing emergency calls via gateway nodes in an Internet Protocol Multimedia Subsystem (IMS) network, the system comprising:
at least one hardware processor;
at least one non-transitory memory, coupled to the at least one hardware processor and storing instructions, which when executed by the at least one hardware processor, perform a process, the process comprising:
receiving a Session Initiation Protocol (SIP) INVITE request associated with an emergency call;
creating a dynamic peer list including gateway nodes that successfully respond to a SIP OPTIONS request;
selecting a gateway node from the dynamic peer list;
initiating a SIP INVITE request associated with the emergency call towards the selected gateway node to deliver the emergency call to a public safety answering point (PSAP);
detecting a failover condition when the selected gateway node fails to respond to the SIP INVITE request within a time period; and
in response to the failover condition, continuing to select a new gateway node from the dynamic peer list and initiate a SIP INVITE request associated with the emergency call towards the new gateway node until a successful response to the SIP INVITE request is received by the E-CSCF.

14. The system of claim 13, wherein the instructions, when executed, further determine, based on presence or absence of information relating to Interconnection Border Control Function (IBCF) or Session Border Controller (SBC), whether to dynamically create the dynamic peer list including IBCF servers as gateway nodes or Border Gateway Control Function (BGCF) servers or Media Gateway Control Function (MGCF) servers as gateway nodes.

15. The system of claim 13, wherein the instructions, when executed, further:
obtain, from a location server, routing information for the PSAP, wherein the routing information for the PSAP includes routing information for a Public Switched Telephone Network (PSTN) PSAP or an Internet Protocol (IP) PSAP, and
wherein the routing information for the PSTN PSAP or the IP PSAP includes an Emergency Service Routing Key (ESRK) that is used by the PSTN PSAP or the IP PSAP to request location information associated with the emergency call.

16. The system of claim 13, wherein the dynamic peer list is updated based on responses from the gateway nodes.

17. The system of claim 13, wherein the instructions, when executed, further:
 determine a failed status when a gateway node from the multiple gateway nodes fails to provide a response to the SIP OPTION message within a set time period; and
 generate a request timeout error when no response is received from the selected gateway node.

* * * * *